(12) United States Patent
Papenfuss et al.

(10) Patent No.: US 7,862,869 B2
(45) Date of Patent: Jan. 4, 2011

(54) TEAR INITIATION AND DIRECTIONAL TEAR FILMS AND PACKAGES MADE THEREFROM

(75) Inventors: Daniel S. Papenfuss, Oshkosh, WI (US); Michael Scott Hartman, Oshkosh, WI (US); Amy Lynn Kraimer, Omro, WI (US); Sam Edward Wuest, Oshkosh, WI (US)

(73) Assignee: Milprint, Inc., Oshkosh, WI (US)

( * ) Notice: Subject to any disclaimer, the term of this patent is extended or adjusted under 35 U.S.C. 154(b) by 982 days.

(21) Appl. No.: 10/689,478

(22) Filed: Oct. 20, 2003

(65) Prior Publication Data

US 2005/0084636 A1 Apr. 21, 2005

(51) Int. Cl.
*B32B 27/32* (2006.01)
*B32B 1/08* (2006.01)

(52) U.S. Cl. ................. 428/34.1; 428/34.9; 428/35.7; 428/35.9; 428/36.7; 428/349

(58) Field of Classification Search ............... 428/35.7, 428/34.9, 35.9, 36.7, 349
See application file for complete search history.

(56) References Cited

U.S. PATENT DOCUMENTS

| | | | |
|---|---|---|---|
| 3,608,815 A | 9/1971 | Bunch | |
| 3,626,143 A | 12/1971 | Fry | |
| 3,909,582 A | 9/1975 | Bowen | |
| 3,985,849 A * | 10/1976 | Notomi et al. | 264/567 |
| 4,009,312 A | 2/1977 | Hayashi et al. | |
| 4,028,475 A | 6/1977 | Willdorf | |
| 4,054,711 A | 10/1977 | Botsolas | |
| 4,133,924 A | 1/1979 | Seino et al. | |
| 4,236,652 A | 12/1980 | Beguhn | |
| 4,493,872 A | 1/1985 | Funderburk et al. | |
| 4,778,058 A | 10/1988 | Yamazaki et al. | |
| 4,834,245 A | 5/1989 | Ohga et al. | |
| 4,903,841 A | 2/1990 | Ohsima et al. | |
| 4,985,300 A | 1/1991 | Huang | |
| 5,001,325 A | 3/1991 | Huizinga | |
| 5,180,615 A | 1/1993 | Havens | |
| 5,229,180 A | 7/1993 | Littmann | |
| 5,302,344 A | 4/1994 | Perlman | |
| 5,613,779 A | 3/1997 | Niwa | |
| 5,630,308 A | 5/1997 | Guckenberger | |
| 5,660,903 A * | 8/1997 | Andersen et al. | 428/36.4 |
| 5,700,560 A | 12/1997 | Kotani et al. | |
| 5,783,266 A * | 7/1998 | Gehrke | 428/34.3 |
| 5,827,583 A | 10/1998 | Ambler | |

(Continued)

FOREIGN PATENT DOCUMENTS

EP 0 060 311 B1 12/1984

(Continued)

*Primary Examiner*—Marc A Patterson
(74) *Attorney, Agent, or Firm*—Christine E. Parsons

(57) ABSTRACT

The present invention provides a flexible multilayer packaging film and packages formed therefrom wherein the films include a first film layer comprising a first biaxially-oriented polymer selected from the group consisting of a polyester, a polyolefin, a polyamide, and a blend thereof and a surface-roughened portion, a second film layer comprising an adhesive, a third film layer comprising a barrier material, a fourth film layer comprising a second biaxially-oriented polymer selected from the group consisting of a polyester, a polyolefin, a polyamide, and a blend thereof and at least one score-line; wherein the packages comprise a tear-initiation area and a directional tear zone.

81 Claims, 6 Drawing Sheets

U.S. PATENT DOCUMENTS

| | | | |
|---|---|---|---|
| 5,874,155 A * | 2/1999 | Gehrke et al. ............... | 428/134 |
| 5,910,138 A | 6/1999 | Sperko et al. | |
| 5,944,709 A | 8/1999 | Barney et al. | |
| 5,969,029 A | 10/1999 | Kotani et al. | |
| 6,004,251 A | 12/1999 | Herrin | |
| 6,099,953 A | 8/2000 | Komai et al. | |
| 6,173,554 B1 | 1/2001 | Marbler | |
| 6,203,535 B1 | 3/2001 | Barney et al. | |
| 6,376,042 B1 | 4/2002 | Peiffer et al. | |
| 6,427,420 B1 | 8/2002 | Olivieri et al. | |
| 6,428,882 B1 | 8/2002 | Peiffer et al. | |
| 6,436,498 B1 | 8/2002 | Rangwalla et al. | |
| 6,455,138 B1 | 9/2002 | Murano | |
| 6,475,597 B2 | 11/2002 | Komai et al. | |
| 6,500,514 B1 | 12/2002 | Blemberg et al. | |
| 2001/0038895 A1 | 11/2001 | Moteki et al. | |
| 2002/0068668 A1 | 6/2002 | Chow et al. | |
| 2002/0081405 A1 | 6/2002 | Marbler et al. | |
| 2002/0086174 A1 | 7/2002 | Genske et al. | |

FOREIGN PATENT DOCUMENTS

| | | |
|---|---|---|
| EP | 0 263 383 B1 | 3/1991 |
| EP | 0 363 540 B1 | 1/1993 |
| EP | 0 575 299 B1 | 4/1993 |
| EP | 0540 184 A1 | 5/1993 |
| EP | 0 596 747 A1 | 5/1994 |
| EP | 0 473 517 B1 | 9/1998 |
| EP | 1 094 013 A1 | 4/2001 |
| EP | 0 957 045 B1 | 9/2002 |
| WO | WO 98/29312 | 7/1998 |
| WO | WO 99/19229 | 4/1999 |
| WO | WO 02/34820 A1 | 5/2002 |

* cited by examiner

TEAR INITIATION AND DIRECTIONAL TEAR FILMS AND PACKAGES MADE THEREFROM

FIELD OF THE INVENTION

The present invention relates to flexible packaging films, particularly, flexible multilayered packaging films which include a score-line and a surface-roughening portion and are suitable for food and/or non-food packaging applications. The present invention also relates to flexible packages formed form a flexible multilayered packaging film having a tear initiation feature and a controllable tear feature.

BACKGROUND OF THE INVENTION

Flexible packaging films provide manufacturers with the ability to improve both the aesthetics and functional performance of packaging for both food and non-food items. With the development of stronger and tougher packaging materials which offer better puncture and tear resistance, the packages themselves have become increasingly more difficult to open. There have been a number of improvements in flexible packaging films over the years that have dealt with methods to initiate and control the opening of packages formed from various flexible packaging film combinations.

U.S. Pat. No. 3,608,815 to Bunch discloses films formed from cellophane laminated to an oriented material, i.e., polypropylene, polyethylene, or polystyrene. The opening aid consists of a rectangular linear pattern of punctures applied to the side edge region of a package. The control of the direction of opening is provided by the molecular orientation of the oriented material.

U.S. Pat. No. 4,834,245 to Ohga, et al. describe a flexible packaging laminate having a first outer layer of a polymeric resin with a molecular orientation in one direction, a second inner aluminum foil layer, a third outer layer of a polymeric resin with a molecular orientation in two directions. Two notches or cuts are made in close proximity on one side of the package to form a tab of film which helps initiate the tearing process. The tab further helps to direct the tearing in a direction parallel with the direction of orientation of the first outer layer which has a principal orientation in a uniaxial direction.

However, due to the enhanced durability and toughness of many packaging films today, maintaining the direction of tearing along a line parallel with the molecular orientation of the packaging film becomes a problem. In fact, the force required to tear the film is often greater than the molecular orientation relied on to control the direction of momentum. In many instances, the lack of control of the direction of tearing leads to uneven tearing of the package film which then results in premature spillage of the packaged contents.

U.S. Pat. No. 4,903,841 to Ohsima, et al. disclose a three-layered packaging film formed from biaxially oriented polyester, aluminum foil and biaxially oriented polypropylene laminate and packages made therefrom. The packages have a notch or cut made in the side heat sealed edge and two surface roughened lines one on each outer layer of the front and rear walls of the package. The surface roughened lines are parallel with the top portion of the package and extend from one side edge to the opposite side edge. To facilitate the tearing of the package, both surface roughened lines must be superimposed on each other and be aligned with the notch on the side edge.

However, it will be recognized to those skilled in the art, that keeping surface roughened lines in registration during the manufacturing process of multiple film packages is difficult without adding greater complexity to the manufacturing process and increased costs to production.

U.S. Pat. No. 5,613,779 to Niwa discloses packaging films having structures such as, for example, a first resin layer being biaxially oriented polyethylene terephthalate, a layer of an aluminum foil, and a second resin layer of non-oriented polypropylene. To guide to opening of the package, the outside surface of the package, which corresponds to the first resin layer of the laminate, is scored to form series of linear slits extending in a direction parallel with molecular orientation of the resin. Two notches are added to the package to initiate the tearing process.

However, the main disadvantage of forming slits to the outside surface is that it adversely affects the external appearance of the package, once the latter have been produced.

U.S. Pat. No. 6,427,420 to Olivieri, et al. describe a four-layered packaging laminate comprising a first layer of polyethylene terephthalate, a second layer of aluminum foil, a third layer of polyamide, and a fourth layer of polypropylene. Packages may be formed by making a transverse fold across a single rectangular sheet of laminate and heat sealing at least two or three edges together. These packages include at least one line of perforations made in the two inner most layers of the package and are produced using a laser beam in the form of a succession of micro dots. These packages may also include a start-off-notch on one of the lateral edges if two lines of perforations are made in the package, however, the start-off-notch must be positioned between the lines of perforation for it to aid in opening of the package.

However, in such a package, there remains a problem because when a start-off-notch is used to initiate tearing of the film, at least two lines of perforation are required to control the direction of tearing of the film during the opening process. Forming two lines of perforation requires either two separate laser sources to create each line of perforation or a single laser source being divided into two beams. In either case, production costs are increased because of the purchase of additional lasers and/or the equipment needed to control a more complicated manufacturing process.

One or more of the aforementioned defects or drawbacks encountered in the prior art are substantially eliminated or ameliorated by embodiments of the present invention in one or more of the following aspects.

In one aspect, the present invention relates to a flexible packaging film comprising a first film layer having an internal and external surface in which the external surface further comprises a surface-roughened portion formed thereon; a second film layer comprising an adhesive; a third film layer comprising either a oxygen barrier material, a water vapor barrier material or both; and a fourth layer which has an internal and external surface wherein the external surface further comprises at least one score-line formed therein. Moreover, a flexible packaging film of the present invention may be easily torn apart manually when a surface-roughened portion on a first film layer and a score-line in a fourth film layer are configured so that they intersect an imaginary axis drawn between both first layer and fourth film layer and when the imaginary axis is perpendicular to the plane of the first film layer or the fourth film layer.

In another aspect, the present invention relates to a package formed from a flexible multilayer film having a tear initiation area which allows the package to be easily opened manually without any heavy manual force or cutting means.

In still another aspect, the present invention relates to a package formed from a flexible multilayer film having a controllable tear zone which affords directional control during the opening process of the package.

SUMMARY OF THE INVENTION

The present invention is directed to a flexible multilayer packaging film having an exterior surface and an interior surface and therebetween having at least a first film layer, a second film layer, a third film layer, and a fourth layer. The first film layer has an internal surface and an opposing external surface, where the external surface includes a surface-roughened portion and comprises an exterior or interior surface of the multilayer packaging film. The first film layer comprises a first biaxially-oriented polymer.

The second film layer of the flexible multilayer packaging film is positioned between the first film layer and third film layer and comprises an adhesive.

The third film layer is positioned between the second film layer and the fourth film layer and includes either an oxygen barrier material or a water vapor barrier material or both selected from the group consisting of polyvinyl alcohol copolymer, ethylene vinyl alcohol copolymer, polyvinyl chloride, polyvinylidene chloride, polyvinyl chloride, polyvinylidene chloride/methyl acrylate copolymer, polyamide, high density polyethylene, metals, metal oxides, organometallic compounds, ceramics and mixtures thereof.

The flexible multilayer packaging film also includes a fourth film layer having an internal surface and an opposing external surface, which includes a score-line made on the external surface of the fourth film layer and where the external surface comprises an exterior or interior surface of the multilayer packaging film. The fourth film layer comprises a second biaxially-oriented polymer.

Furthermore, the surface-roughened portion on the external surface of the first film layer and the score-line on the external surface of the fourth film layer intersect at least one axis drawn between the first film layer and the fourth film layer wherein the at least one axis is perpendicular to the plane of the first film layer or the fourth film layer.

In one embodiment of the present invention, the flexible multilayer packaging film forms a package having at least one first folded side edge, a top first seal edge portion and an opposite bottom second seal edge portion in parallel with the top first seal edge portion, and a third seal portion positioned perpendicular between the top first seal edge portion and the opposite bottom second seal edge portion and parallel with the at least one first folded side edge. A tear-initiation area is provided which facilitates the opening of the package, and is formed by having at least one first folded side edge of the package superimposed on the surface-roughened portion in the external surface of the first film layer. In this regard, the package can be easily opened by a relatively weak manual force at the tear-initiation area obviating the need to cut the package with a knife or scissors. Additionally, the package is provided with a directional tear zone which extends along a line superimposed over the score-line on the external surface of the fourth film layer. During the opening of the package, the tear begins at the tear-initiation area and then propagates in the direction of the underlining score-line.

In a preferred embodiment of the present invention, the flexible multilayer packaging film has the first film layer and fourth film layer which may include the same or different biaxially-oriented polymer, more preferably a biaxially-oriented polymer selected from the group consisting of a polyester, a polyolefin, a polyamide or a blend thereof, and most preferably, a biaxially-oriented polymer selected from the group consisting of a polyethylene terephthalate polymers, a polypropylene, a polyamide, or a blend thereof. The first film layer of the flexible multilayer packaging film may be an inner surface film layer or preferably, an outer surface film layer of the multilayer packaging film. The fourth film layer of the multilayer film may be an outer surface film layer or preferably, an inner surface film layer. The fourth film layer may further include an adhesive applied to portions of the external surface of the layer. Furthermore, the flexible multilayer packaging film in accordance with the present invention has an unrestrained linear thermal shrinkage in the machine direction and transverse direction of between 0-10%, preferably, between 0-5% at 85° C. (degrees Celcius).

Suitable oxygen barrier material have an oxygen transmission rate of from about 0-10 $cm^3$/100 $in.^2$ (cubic centimeters per square inches) over 24 hr. (hour) at 0% R.H. (relative humidity) and 23° C., more preferably from 0.001-5.0 $cm^3$/100 $in.^2$ over 24 hr. at 0% R.H. and 23° C., most preferably 0.01-1.0 $cm^3$/100 $in.^2$ over 24 hr. at 1 atm (atmosphere) and 0% R.H. and 23° C.

Suitable water vapor barrier material have a water vapor transmission rate of from about 0-10 g/100 $in.^2$ (grams per square inches) over 24 hr. at 90% R.H. and 38° C., more preferably from 0.001-5.0 g/100 $in.^2$ over 24 hr. at 90% R.H. and 38° C., most preferably 0.01-1.0 g/100 $in.^2$ over 24 hr. at 90% R.H. and 38° C.

In one embodiment, the flexible multilayer packaging film has a barrier material comprising a metallic coating on the internal surface of the fourth film layer of the film having a thickness of from about 200-700 Å (Angstroms). Preferably, the metallic coating comprises a material selected from the group consisting of metal, metallic oxides, organometallic compounds, ceramics or mixtures thereof. More preferable, the metallic coating comprises aluminum, zinc, nickel, copper, bronze, gold, silver, tin, and alloys thereof. Accordingly, the coating may be produced by any technique useful for fabricating sub-micron thick metallic layers, such as, for example, electroplating, sputtering, or vacuum vapor-deposition.

In one preferred embodiment, the flexible multilayer packaging film has at least one score-line as a continuous groove in the external surface of the fourth film layer. In an alternative embodiment, at least one score-line is a non-continuous sequence of perforations separated by predetermined or random distances. Preferably, the depth of at least one score-line in the exterior surface of the fourth film layer is of from about 50-95% of this layer. The score-line may be produced by mechanical means such as, for example, cutting blade or roller. Preferably, the score-line is produced by optical ablation using a laser beam which affords more control over the shape, size and depth of penetration of the score-line.

Preferably, the flexible multilayer packaging film has a thickness of the entire film from about 0.75-3.5 mils (19-89 microns).

In one preferred embodiment, the package includes at least one first folded side edge, a top first seal edge portion, an opposing bottom second seal edge portion parallel with the top seal edge portion, and a third seal portion disposed perpendicular between the first seal edge portion and second seal edge portion and parallel to the at least one first folded side edge. In another preferred embodiment, the package includes a first folded side edge, a second folded side edge opposite the first folded side edge, a top first seal edge portion, an opposing bottom second seal edge portion parallel with the top seal edge portion, and a third seal portion disposed perpendicular between the first seal edge portion and second seal edge portion and parallel to the at least one first folded side edge.

In still another preferred embodiment, the package includes the top first seal edge portion, bottom second seal edge portion, or third seal portion of the package having a cold-seal. Alternatively, in another preferred embodiment, the package includes the top first seal edge portion, bottom second seal edge portion, or third seal portion of the package having a heat-seal. In yet another preferred embodiment, the package includes the top first seal edge portion, bottom second seal edge portion, or third seal portion of the package having a cold-seal and a heat-seal.

The nature and further characteristic features of the present invention will be made clearer from the following descriptions in conjunction with the accompanying drawings.

DETAILED DESCRIPTION OF THE INVENTION

Figure 1:
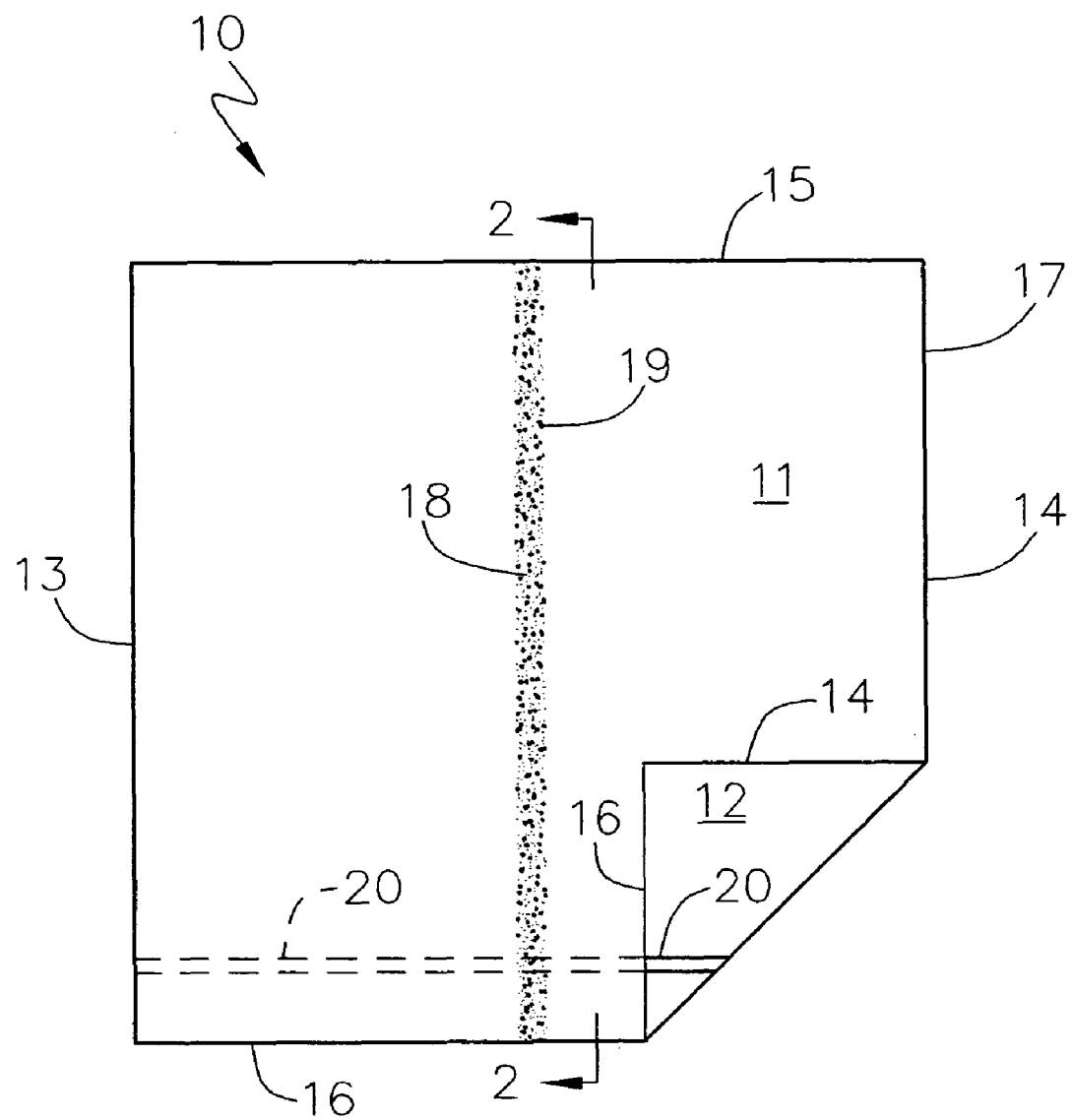
FIG. 1 is a front view of one example of the flexible multilayer packaging film having a surface-roughened portion and a score-line according to the present invention.

As used herein, the term "polymer" refers to the product of a polymerization reaction, and is inclusive of homopolymers, as well as copolymers including e.g., bipolymers, terpolymers, etc. In general, the layers of a film may consist essentially of a single polymer, or may have additional polymers together therewith, i.e., blended therewith.

As used herein, terminology employing a "/" with respect to the chemical identity of a copolymer (e.g., polyvinylidene chloride/methyl acrylate copolymer), identifies the comonomers which are copolymerized to produce the copolymer.

As used herein, the term "comonomer" refers to a monomer which is copolymerized with at least one different monomer is a copolymerization reaction, the result of which is a copolymer.

As used herein, the term "multilayer" refers to a plurality of layers in a single film structure generally in the form of a sheet or web which can be made from a polymeric material or a non-polymeric material bonded together by any conventional means known in the art (i.e., coextrusion, extrusion coating, and lamination, vacuum vapor deposition coating, solvent coating, emulsion coating, or suspension coating or combination of one or more thereof. The multilayer film of the present invention may include as many layers as desired, preferably, at least four layers.

As used herein, the term "biaxially-oriented" refers to a polymer web or sheet which forms a film structure in which the web has been elongated in two directions at elevated temperatures followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the polymeric web. Upon subsequently heating of certain unrestrained, unannealed, biaxially-oriented sheet of polymer to its orientation temperature, heat-shrinkage may be produced. Following orientation, the biaxially-oriented polymer web is preferably cooled and then heated to an elevated temperature, most preferably to an elevated temperature which is above the glass transition temperature and below the crystalline melting point of the polymer. This reheating step, which may be referred to as annealing or heat setting, is performed in order to provide a polymeric web of uniform flat width. In accordance with the present invention, the biaxially-oriented polymer web used to form a film layer is heated to an elevated temperature in order to provide a packaging film with an unrestrained linear thermal shrinkage in the machine direction and transverse direction of between 0-10%, preferably, between 0-5% at 85° C. as measured in accordance with ASTM D-2732-96 test method, which is incorporated herein by reference. The biaxially-oriented polymeric web can be annealed or heated to an elevated temperature either in-line with (and subsequent to) or off-line from (in a separate process) the orientation process. However, an annealing process which is in-line with the orientation process is preferred.

As used herein, the term "barrier material" refers to an oxygen and/or water vapor barrier materials. Barrier materials used in packaging film include, for example, polyvinyl alcohol copolymers, ethylene vinyl alcohol copolymers, polyvinyl chlorides, polyvinylidene chloride homopolymers and copolymers, polyvinylidene chloride/methyl acrylate copolymers, polyester homopolymers and copolymers, polyamide homopolymers and copolymers, polyolefin homopolymers and copolymers such as polypropylene, polyethylene, preferable, high density polyethylene, metals such as aluminum, zinc, nickel, copper, bronze, gold, silver, tin, or alloys thereof, metal oxides, organometallic compounds, ceramics and mixtures thereof.

The term "oxygen barrier" refers to any material which will control the oxygen permeability of the entire film. For perishable food packaging applications, the oxygen transmission rate (OTR) desirably should be minimized. The term "oxygen transmission rate" is defined herein as the amount of oxygen in cubic centimeters ($cm^3$) which will pass through a 100 $in.^2$ of film in 24 hr. at 0% R.H. and 23° C. (or $cm^3$/100 $in.^2$ over 24 hr. at 0% R.H. and 23° C.). The thickness (gauge) of the film has a direct relationship on the oxygen transmission rate. Packaging films which are useful as an oxygen barrier are required to have an OTR value of from about 0-10.0 $cm^3$/100 $in.^2$ over 24 hr. at 0% R.H. and 23° C. at 1.0 mils or less. Oxygen transmission may be measured according to ASTM D-3985-81 which is incorporated herein by reference.

As used herein, the term "water vapor transmission rate or (WVTR)" refers to the amount of water vapor (grams) which will pass through 100 $in.^2$ of film in 24 hours at 90% R.H. and 38° C. or g/100 $in.^2$ over 24 hr. at 90% R.H. and 38° C. The water vapor transmission rate is thickness dependent. Typical packaging films suitable as a water vapor barrier have an WVTR value of from 0-10.0 g./100 $in.^2$ over 24 hr. at 90% R.H. and 38° C. at a thickness of 1.0 mils or less. Water vapor transmission rate may be measured according to ASTM F-1249 which is incorporated herein by reference.

As used herein, the term "metallic coating" refers to the coating on any polymeric substrate having at least one surface coated with a metal, metallic oxide, ceramic or mixtures thereof. Metal suitable for use as a coating may include aluminum, zinc, nickel, copper, bronze, gold, silver, and alloys made thereof. The coating process or metalization may be accomplished by conventional techniques known to those skilled in the art, such as electroplating, sputtering, or vacuum vapor-deposition. Metalization preferably is done by vacuum vapor-deposition where a polymeric substrate is passed over a source of metal vapor with the surface of the substrate facing the source of metal vapor. The metal vapor condenses on the substrate and produces a thin coating of metal having a thickness of from about 10-10,000 Å, preferably, of from about 100-1,000 Å, most preferably, of from about 200-700 Å. Metallized substrates are commercially available and examples of suitable materials for use in the present invention include MXT which is an aluminum-coated biaxially-oriented polypropylene supplied by Applied Extrusion Technologies, Inc. of New Castle, Del., U.S.A. and an aluminum-coated biaxially-oriented polypropylene Metallyte™ TSPM, MET and MET-HB all supplied by ExxonMobil Chemical Company of Houston, Tex., U.S.A.

As used herein, the term "adhesive" refers to a polymeric material serving a primary purpose or function of adhering two surfaces to one another. In the present invention, the adhesive may adhere one film layer surface to another film layer surface or one area of a film layer surface to another area of the same film layer surface. The adhesive may comprise any polymer, copolymer or blend of polymers having a polar group thereon, or any other polymer, homopolymer, copolymer or blend of polymers including modified and unmodified polymers, e.g., grafted copolymers, which provide sufficient interlayer adhesion to adjacent layers comprising otherwise nonadhering polymers. The adhesive may include water-soluble adhesives, radiation curable or heat-curable adhesives, hot melt adhesives, and pressure sensitive adhesives. Examples of these adhesive materials include polyacrylates, acrylic emulsions, polyurethanes, polyamides, reaction products of polyamide with vegetable oil acids, epoxies, ethyleneamines, polysiloxanes, silicone rubber, polyalkylene glycols, polyesters, sulfopolyesters, etc. Adhesives in the present invention may include coextruded polymeric layers. In addition, the adhesives conform to the compositional requirements of the U.S. Food & Drug Administration Code of Federal Regulations, Title 21, 175.105, Adhesives which is incorporated, herein in its entirety, by reference. Specific examples of suitable adhesives for use in the present invention are supplied by Rohm and Haas Company, Philadelphia, Pa., U.S.A., and are sold under the trade name Robond™ L-90D and Robond™ L-100.

As defined herein, the term "cold-seal adhesive" (also known as a contact adhesive) is one that preferentially adheres to itself or a chemically similar material under pressure or force without the need for significantly elevated temperatures e.g., without the need for temperatures above 50° C. Cold seal adhesives are typically nonadhering or only very slightly adhering to chemically dissimilar surfaces at temperatures of about 15° C. to about 50° C. The cold-seal adhesive preferably does not generally stick to uncoated surfaces or to the contents placed inside the package. When placed against each other, cold-seal adhesives typically require moderate pressure (such as that exerted by fingertip pressure) to achieve a bond without the application of significantly elevated temperatures. This is, packages may be sealed at room temperature, i.e., about 20° C. to about 30° C., and even lower, e.g. 15° C., as well as at temperatures of up to about 50° C., if the packaged product is not sensitive to such temperatures. Thus a cold-seal adhesive as used herein is one that does not require elevated temperatures, i.e., above about 50° C., for activation of its adhesive characteristics. This may include, however, cold-seal adhesives that can be hot melt coated, but that do not require the application of heat to form a seal. A specific example of a cold-seal adhesive is supplied by Rohm and Haas Company, Philadelphia, Pa., U.S.A., and are sold under the trade name Coseal™ 30061A.

As defined herein, the term "cold-seal" refers to the union of a surface (or portion thereof) of one film to a surface (or portion thereof) of another film or of two different portions of a surface of the same film by means of a cold-seal adhesive.

As used herein, the term "heat-seal" refers to the union of a surface (or portion thereof) of one film to a surface (or portion thereof) of another film or of two different portions of a surface of the same film using heat and pressure. The heat-seal is achieved by bringing two surfaces or portions of a surface into contact, or at least close proximity, with one another and then applying sufficient heat and pressure to a predetermined area of the two surfaces to cause the contacting surfaces to become molten and intermix with one another, thereby forming as essentially inseparable fusion bond between the two surfaces in the predetermined area when the heat and pressure are removed therefrom and the area is allowed to cool.

As used herein, the term "optical ablation" refers a method of localized vaporization or decomposition of polymeric materials by means of a controlled laser beam which can be used to form a groove or score-line in a thermoplastic materials. This method of forming score-lines by optical ablation in thermoplastic substrates is well known from U.S. Pat. Nos. 3,626,143; 3,790,744; 3,909,582; 4,549,063; 5,001,325; 5,010,231; and 5,630,308 all of which are incorporated herein by reference. As is well know, thermoplastic material respond to increased temperature by melting and/or decomposition. Decomposition predominates at temperatures from 50-100° C. above the materials melting point. In decomposition enough energy or heat is supplied to the thermoplastic material from a laser beam to completely vaporize the regions upon which the beam impinges.

As is also known, a laser is a device which emits a powerful, concentrated beam of light of high energy. The beam is stimulated, amplified, electromagnetic radiation and is made up of light waves which are, for all practical purpose, coherent, i.e., in phase, and monochromatic. i.e., of the same wavelength. Examples of several types of lasers available for industrial use are: gaseous lasers such as carbon dioxide or helium-neon; solid state light pumped lasers such as ruby, neodymium-yttrium aluminum garnet (Nd-YAG), or glass: semi-conductor lasers such as gallium arsenide, and plastic lasers and lasers using conjugated organic molecules such as benzene, toluene or naphthalene. Each type of laser emits its own specific and characteristic wavelength, i.e., one of a well defined frequency depending on the lasing medium employed. Carbon dioxide ($CO_2$) lasers can also be tuned to a wavelength within a predetermined range. The wavelength is selected on the basis of the wavelength dependent absorption spectrum of the thermoplastic material to be processed, as well as, available lasing wavelengths of $CO_2$ isotopes. Preferably, the wavelength is selected on the basis of absorption capacity for a particular thermoplastic material forming a specific layer in a multilayer packaging film. The absorption capacity is a property of thermoplastic materials which may have greatly varying values in different materials. When the wavelength is tuned in such a manner that the material to be processed absorbs most of the laser energy, the materials forming the other layers of a packaging film remain unaffected.

For industrial applications, using the optical ablation method to form one or more score-lines on an advancing web of packaging film is known from U.S. Pat. No. 3,909,582. In that arrangement the laser beam is stationary and the channel extends longitudinally in the direction of the advancing web of packaging film. By imparting to the laser source a reciprocating movement transverse to the direction of the advancing web, the score-line may acquire an approximately sinusoidal configuration, as described in U.S. Pat. No. 4,549,063. In the method disclosed in U.S. Pat. Nos. 5,001,325 and 5,010,231, a groove or score-line is provided according to a recurring pattern on one or more sides of a web of packaging material advancing at a uniform, adjustable speed by using a laser source having an adjustable intensity which may move in two mutually perpendicular directions. By controlling the motion between the material being processed and the laser beam, and/or the intensity of the laser beam, the desired dimensions of the score-line, i.e., depth and radius, may be obtained. Accordingly, a preferred embodiment of the present invention, includes a single continuous score-line in the external surface of the fourth film layer of the packaging film and penetrating to a depth of from about 50-95% of the thickness of the fourth film layer. Another preferred embodiment of the present invention, includes a non-continuous score-line in the external surface of the fourth film layer of the packaging film and penetrating to a depth of from about 50-95% of the thickness of the fourth film layer.

As used herein, the term "surface-roughened" refers to dimples, indentations, scratches, bores, holes, perforations, and the like, on an external surface of a film. It will be recognized by those skilled in the art, that the dimples, indentations, scratches, bores, holes, perforations, and the like may have a random or regular repeating arrangement. Generally, a predetermined portion (less than the entire area) of a surface of the film is treated in order to provide a surface-roughened portion. The surface-roughened portion may be formed by mechanical means, e.g., subjecting the external surface of the film layer to knurling by a roller formed with a plurality of circumferentially extending projections as described, for example, in U.S. Pat. Nos. 4,543,279 and 4,778,058, which are incorporated herein by reference. Alternatively, non-mechanical methods may be used which include corona discharge, plasma discharge, ultrasonic wave, and optical ablation.

As used herein, the term "polyester" refers to homopolymers or copolymers having an ester linkage between monomer units which may be formed, for example, by condensation polymerization reactions between a dicarboxylic acid and a glycol. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. A preferable embodiment of this invention includes polyethylene terephthalate and most preferable, biaxially-oriented polyethylene terephthalate. Examples of biaxially-oriented polyethylene terephthalate suitable for use in the present invention may be obtained from Mitsubishi Polyester Film, LLC of Greer, S.C., U.S.A., which are sold under the trademark Hostaphang 2BCR and 24WS or from ICI Films of Wilmington, Del., U.S.A., which are sold under the trademark MELINEX® 850H and 851H.

As used herein, the term "polyolefin" refers to homopolymers, copolymers, including e.g. bipolymers, terpolymers, etc., having a methylene linkage between monomer units which may be formed by any method known to those skill in the art. Suitable examples of polyolefins include polyethylene, medium density polyethylene, high density polyethylene, polyethylenes comprising copolymers of ethylene with one or more alpha-olefins such as butene-1, hexene-1, octene-1, or the like as a comonomer, linear low density polyethylene, very low density polyethylene, ultra low density polyethylene, ethylene/propylene copolymers, polypropylene, propylene/ethylene copolymer, polyisoprene, polybutylene, polybutene, poly-3-methylbutene-1, poly-4-methylpentene-1, ionomers and the like. A preferable embodiment according of this invention includes polypropylene and most preferable, biaxially-oriented polypropylene. Specific examples of biaxially-oriented polypropylene suitable for use in the present invention include Bicor CSR-2 obtainable from ExxonMobil Chemical Company of Houston, Tex., U.S.A. and RLS available from Applied Extrusion Technologies (AET), Inc. of New Castle, Del., U.S.A. Ethylene copolymers have a majority of their polymeric units derived from ethylene monomer whereas propylene copolymers have a majority of their polymeric units derived from propylene monomer.

As used herein, the term "polyamide" refers to homopolymers, copolymers, or terpolymers having an amide linkage between monomer units which may be formed by any method known to those skill in the art. Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), as well as nylon 46, nylon 66 and nylon 69 and the like. Useful aliphatic polyamide copolymers include poly(hexamethylene adipamide) (nylon 6,6), poly (hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), as well as copolymers thereof and as well as other nylons which are not particularly delineated here. Exemplary of aliphatic/aromatic polyamides include poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides may also be used. Aliphatic/aromatic polyamides may be prepared by known preparative techniques or may be obtained from commercial sources. Specific examples of suitable polyamides for use in the present invention include Capran® Emblem™ 1500, 1500T, and MT1500 which are available form Honeywell International Specialty Films of Pottsville, Pa., U.S.A.

The present invention will be described hereunder in detail with reference to the accompanying drawings mentioned above.

Referring now to FIG. 1, a flexible multilayer packaging film 10 according to the present invention is depicted with a turned up corner. Film 10 has a top multilayer film surface 11 and bottom multilayer film surface 12. The depicted film 10 has a first side edge 13 and opposing parallel second side edge 14. First and second side edges 13 and 14 are connected by third side edge 15 and opposing parallel fourth side edge 16. Thus first, third, second and fourth edges 13, 15, 14 and 16 are sequentially connected to form a perimeter 17 of film 10. Top surface 11 is provided with a surface-roughened portion 18 which extends from third side edge 15 to opposing fourth side edge 16. Advantageously, this surface-roughened portion 18 maybe made in the machine direction by a continuous operation in which a roller or wheel (not shown) having an abrasive or cutting surface (e.g. knurled or coated with grit) is continuously (or optionally periodically) contacted with the film 10 traveling in the machine direction to produce a surface-roughened portion 18 as an elongated strip 19. This surface-roughened portion 18 may be applied as described in U.S. Pat. Nos. 4,778,058; 4,834,245; and 4,903,841 which are hereby incorporated by reference. On opposing surface 12 of film 10 is a score-line 20 which extends from first side edge 13 to opposing second side edge 14. It will be appreciated that surface-roughened portion elongated strip 19 may be positioned anywhere between first side edge 13 and second side edge 14, and that a plurality of strips may be provided e.g. to permit use of a large width film to be slit into multiple lanes for forming multiple packages. Formation of multiple stripes and lanes may be accomplished by those skilled in the art in view of the present disclosure without undue experimentation. Similarly, score-line 20 may optionally be provided as a plurality of transversely spaced apart score-lines to permit continuous production of film for forming into multiple packages. While score-line 20 and surface-roughened elongated strip 19 are depicted as being perpendicular in the superposed view of strip 19 over the hidden view of score-line 20 in FIG. 1 (See also FIG. 5), it will be appreciated that means such as optical ablation for providing the score-line 20 may be adjusted to provide a score-line having an angle less than or greater than 90° relative to the superimposed crossing and that the score-line 20 may also be provided in a variety of shapes including curves or sinusoidal and may also be provided either continuously or intermittently across film 10 from first edge 13 to second edge 14. While score-line 20 is depicted as penetrating from bottom multilayer film surface 12 to less than the entire thickness of film layer 4, it will be appreciated that score-line 20 may be adjusted to provide a score-line having a depth extending from a bottom multilayer film surface to the entire thickness of a bottom film layer. Alternatively, the depth of score-line 20 may extend from a bottom multilayer film surface to the entire thickness of a bottom film layer and the entire and/or partial thickness of one or more adjacent layers so as not to adversely affect the barrier properties of the resulting film It will also be appreciated that score-line 20 may be provided in any length across film 10 between first edge 13 to second edge 14 and be positioned anywhere between third side edge 15 and opposing parallel fourth side edge 16 with the proviso that surface-roughened portion 18 and said score-line 20 intersect at least one axis drawn perpendicular to the plane of film 10 when film 10 is positioned in a lay flat condition.

Figure 2:
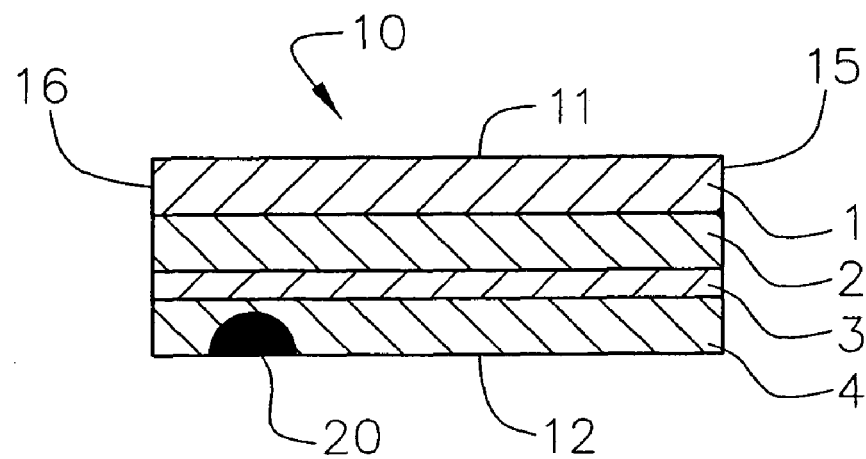
FIG. 2 is a schematic sectional view one example of the flexible multilayer packaging film having a four-layer structure and a score-line according to the present invention.

Referring now to FIG. 2, a cross-section of film 10 taken along lines 2-2 of FIG. 1 shows a four-layer embodiment of a multilayer flexible packaging film 10 according to the present invention. In FIG. 2 and the other views presented herein relative layer thicknesses and other dimensions are not to scale but are shown for purposes of illustration and relative sizes may vary. In FIG. 2, film 10 extends from third side edge 15 to fourth side edge 16 and has a top surface 11 and opposing bottom surface 12. Film 10 has four layers including a first film layer 1 which serves as an outer top film layer 11 and comprises a biaxially-oriented polymer preferably a biaxially-oriented polyolefin or a blend thereof or a biaxially-oriented polyester or blend thereof; a second film layer 2 interposed between first film layer 1 and third film layer 3 where the second film layer 2 comprises an adhesive and which serves as an internal film layer; a third film layer 3 positioned between second film layer 2 and fourth film layer 4 where the third layer 3 comprises an oxygen barrier material and serves as an internal layer; and a fourth film layer 4 which functions as a bottom surface layer 12 and comprises a biaxially-oriented polymer, preferably a biaxially-oriented polyolefin or blend thereof or a biaxially-oriented polyester of blend thereof. In this embodiment, second film layer 2 is in contact with first film layer 1 and third film layer 3, and the third film layer 3 is in contact with the second film layer 2 and the fourth film layer 4.

Figure 3:
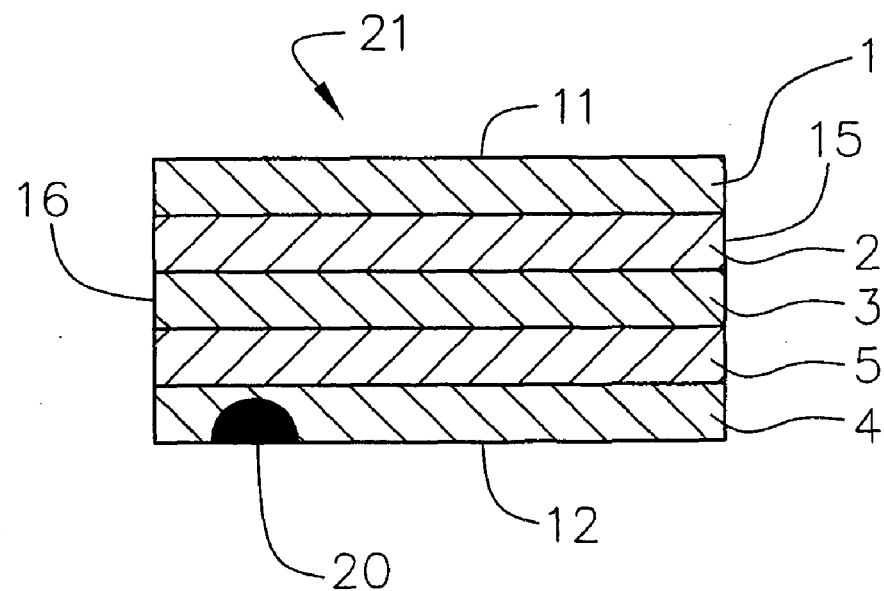
FIG. 3 is a schematic sectional view one example of the flexible multilayer packaging film having a five-layer structure and a score-line according to the present invention.

FIG. 3 shows one example of an alternative embodiment of a multilayer flexible packaging film 21 according to the present invention having five layers. In this example, film 21 has four layers similar to those described above for FIG. 2 but includes a fifth film layer 5 interposed and in contact with third film layer 3 and fourth film layer 4. Fifth film layer 5 serves as an internal film layer and comprises an adhesive. The five film layers 1-5 may include various additives or processing aids e.g. antistatic agents, ultraviolet radiation absorbents, plasticizers, lubricants, colorants, and so forth if desired.

Optionally, one or more additional film layers, e.g., of metal foil, adhesive, oxygen barrier, or unoriented, monoaxially oriented or biaxially oriented films may be provided with the above described four or five layer structure as an internal and/or surface layer(s) in accordance with the present invention. It will be further appreciated that the inventive multi-layer film may be made by coextrusion, lamination, coating lamination or similar processes or a combination thereof using known techniques in the art for making multilayer films in view of the present disclosure.

In FIGS. 2 and 3, the layers of the four-layer film structure 10 and five-layer film structure 21 may have suitable individual thicknesses ranging from about 0.000787 mils (or 200 Å) to less than about 2.0 mils, preferably to less than about 1.5 mils, and most preferably, to less than about 1.0 mils. The first layer 1 may be a one-ply material, a two-ply, or a three-ply material and have a thickness from about 0.4 mils to less than about 2.0 mils, preferably to less than about 1.5 mils, and most preferably, to less than about 1.0 mils. The film layer 2 and fifth film layer 5 may have individual thicknesses from about 0.1 mils to about 1.0 mils, preferably to about 0.5 mils, and most preferably, to about 0.35 mils. The third film layer 3 may have a thickness from about 0.000787 mils (or 200 Å) to less than about 2.0 mils, preferably to less than about 1.5 mils, most preferably, to less than about 1.0 mils. The fourth film layer 4 may be a one-ply material, a two-ply, or a three-ply material and have a thickness from about 0.4 mils to less than about 2.0 mils, preferably to less than about 1.5 mils, and most preferably, to less than about 1.0 mils. The thickness of the entire four-layer 10 or five-layer film 21 structure may range from about 0.75 mils to about 6.5 mils preferably to about 5.5 mils, and most preferably, to about 3.5 mils.

Figure 4:
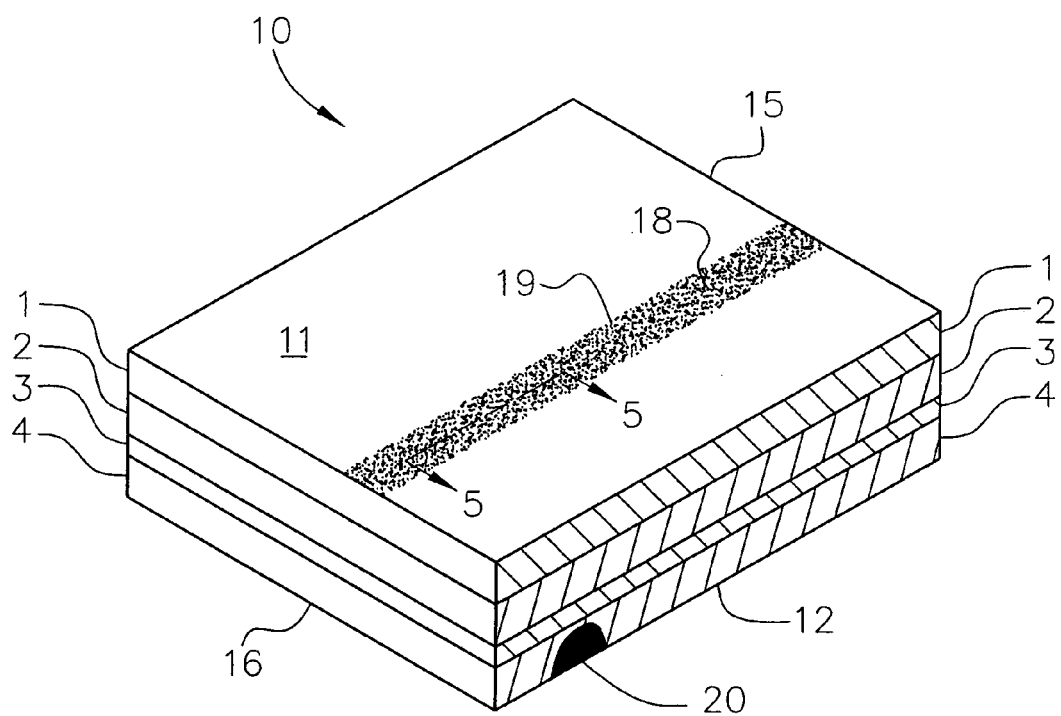
FIG. 4 is a cross-sectional view showing an example of a surface-roughened pattern and a score-line of a flexible multilayer packaging film having a four-layer structure from a first perspective.

FIG. 4 shows a perspective view of the four-layer structure 10 having layers 1, 2, 3, and 4 of the present invention having a surface-roughened portion 18 forming an elongated strip 19 of the first film layer 1. In this preferred embodiment, the surface-roughened portion 18 may be configured, for example, as an arrangement of indentations having a predetermined shape and size in the top surface layer 11 of the first film layer 1. Surface-roughened elongated strip 19 extends from the third side edge 15 to fourth side edge 16. Score-line 20 is shown as extending partially through the thickness of fourth film layer 4 which comprises the bottom surface layer 12.

Figure 5:
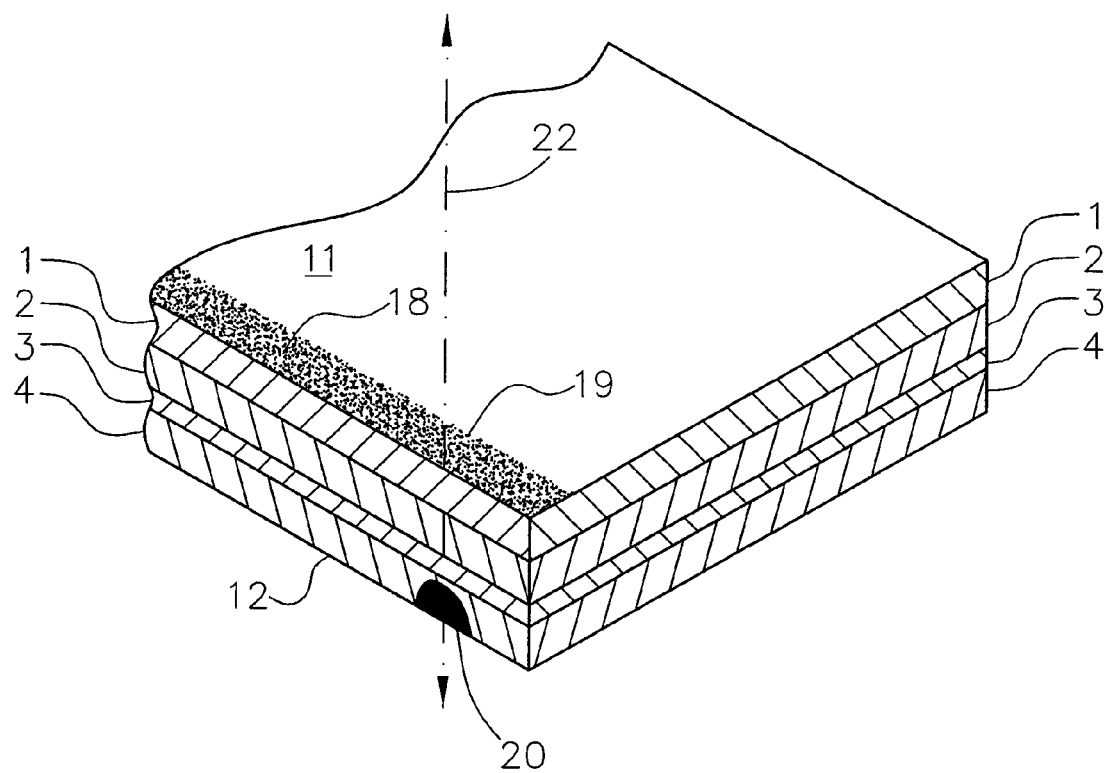
FIG. 5 is another cross-sectional view showing an example of a surface-roughened pattern and a score-line of a multilayer flexible multilayer packaging film having a four-layer structure from a second perspective.

FIG. 5 illustrates a sectional view taken along line 5-5 of FIG. 4 of a preferred embodiment according to the present invention. In this example, the surface-roughened elongated strip 19 extends in the machine direction of the extruded film layer and the score-line 20 extends in the transverse direction across the width of the film layer. The score-line 20 on fourth film layer 4 and the surface-roughened portion 18 on first film layer 1 may be formed anywhere on their respective layers such that both score-line 20 and surface-roughened elongated strip 19 intersect at least one virtual axis 22 drawn between the first film layer 1 and fourth film layer 4. As illustrated, the virtual axis 22 is perpendicular to the plane of first film layer 1 or fourth film layer 4.

Referring now to FIGS. 1-5, a score-line 20 is made in the bottom surface layer 12 of the fourth film layer 4 in a preferred embodiment of the present invention. For all films and embodiments of the invention, this score-line 20 may be made by optical ablation to any depth in the bottom surface layer 12, but preferably, to a depth of from about 50-95% of the thickness of the bottom surface layer 12. In another embodiment, a plurality of score-lines may be formed on the surface of the bottom surface layer in the same manner as mentioned hereinbefore. Referring to FIG. 5, the score-line 20 may have any shape, width or length provided that the placement of the score-line 20 on the surface of the bottom film layer is such that the score-line and surface-roughened portion 18 intersect at least one imaginary axis 22 drawn between the first film layer 1 and the fourth film layer 4, where the axis is perpendicular to the plane of the first film layer or fourth film layer. In this arrangement, directional control of tearing of the entire film structure and package is achieved. Score-line 20 may be continuous i.e., a single long ablative groove, or non-continuous, i.e., a sequence of ablated grooves separated by segments of non-ablated surface.

Figure 6:
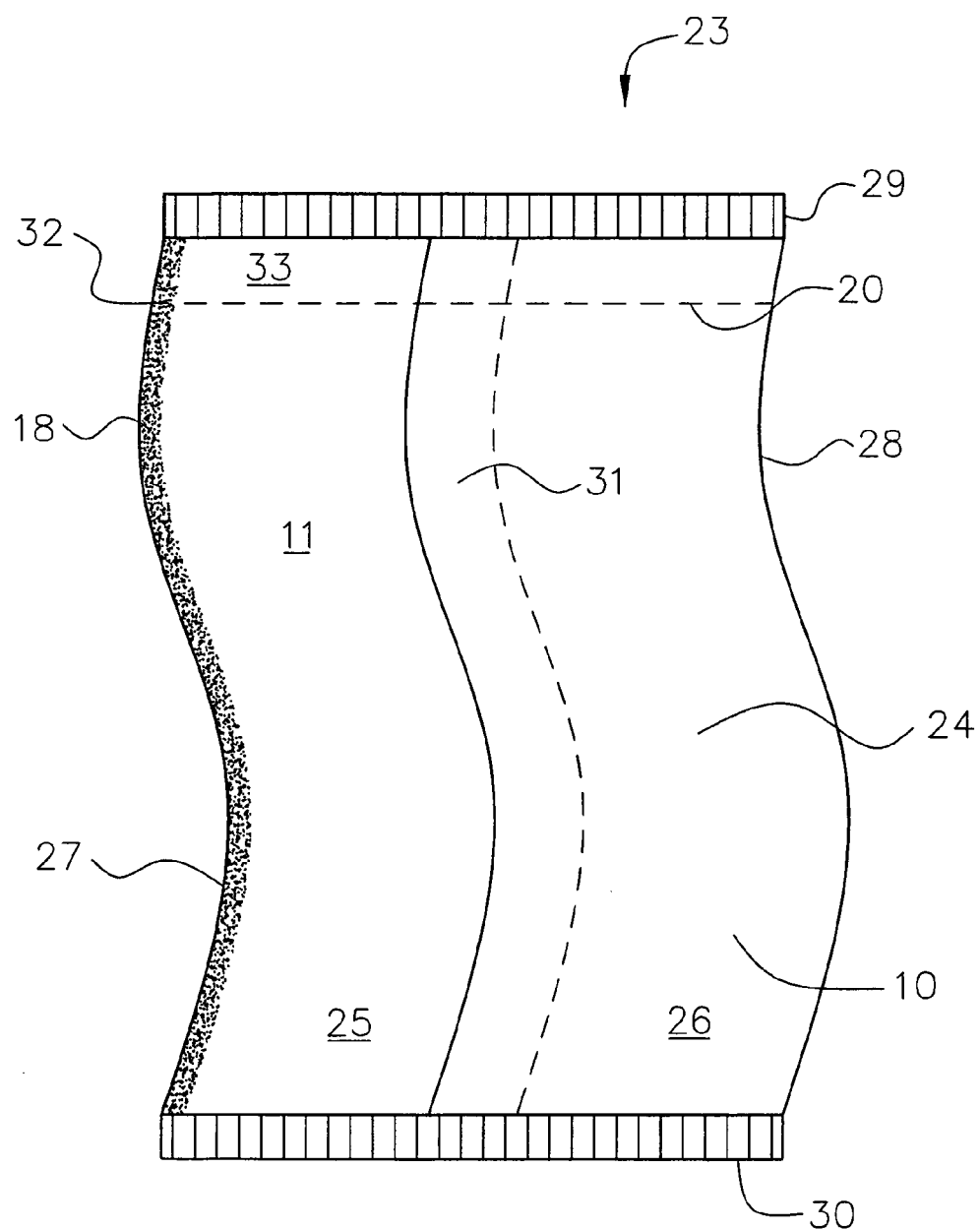
FIG. 6 is an illustration of one embodiment of a package which is manufactured by a flexible multilayer packaging film according to the present invention.

FIG. 6 represents another embodiment of the present invention in which a package 23 is formed from a flexible multilayer packaging film 10 as described herein. In this example, a package 23 is shown having a rear surface 24 facing outward with a left side portion 25 and right side portion 26. Preferably, package 23 includes a first folded side edge 27, an opposite second folded side edge 28 in parallel with the first folded side edge 27, a top first seal edge portion 29 and an opposite bottom second seal edge portion 30 in parallel with the top first seal edge portion, and a third seal portion 31 on a rear surface 24 of said film. Third seal portion 31 is positioned perpendicular to top first seal edge portion 29 and bottom second seal edge portion 30 and parallel with first folded side edge 27. The package 23 is fabricated such that the first folded side edge 27 or the opposing second folded side edge 28 is superimposed on the surface-roughened portion 18 of the top surface layer 11 of said package thereby creating a tear initiation area 32. Score-line 20 is depicted by hidden lines which defines the directional tear zone 33 extending from the first folded side edge 27 to the opposite second folded side edge 28.

Figure 7:
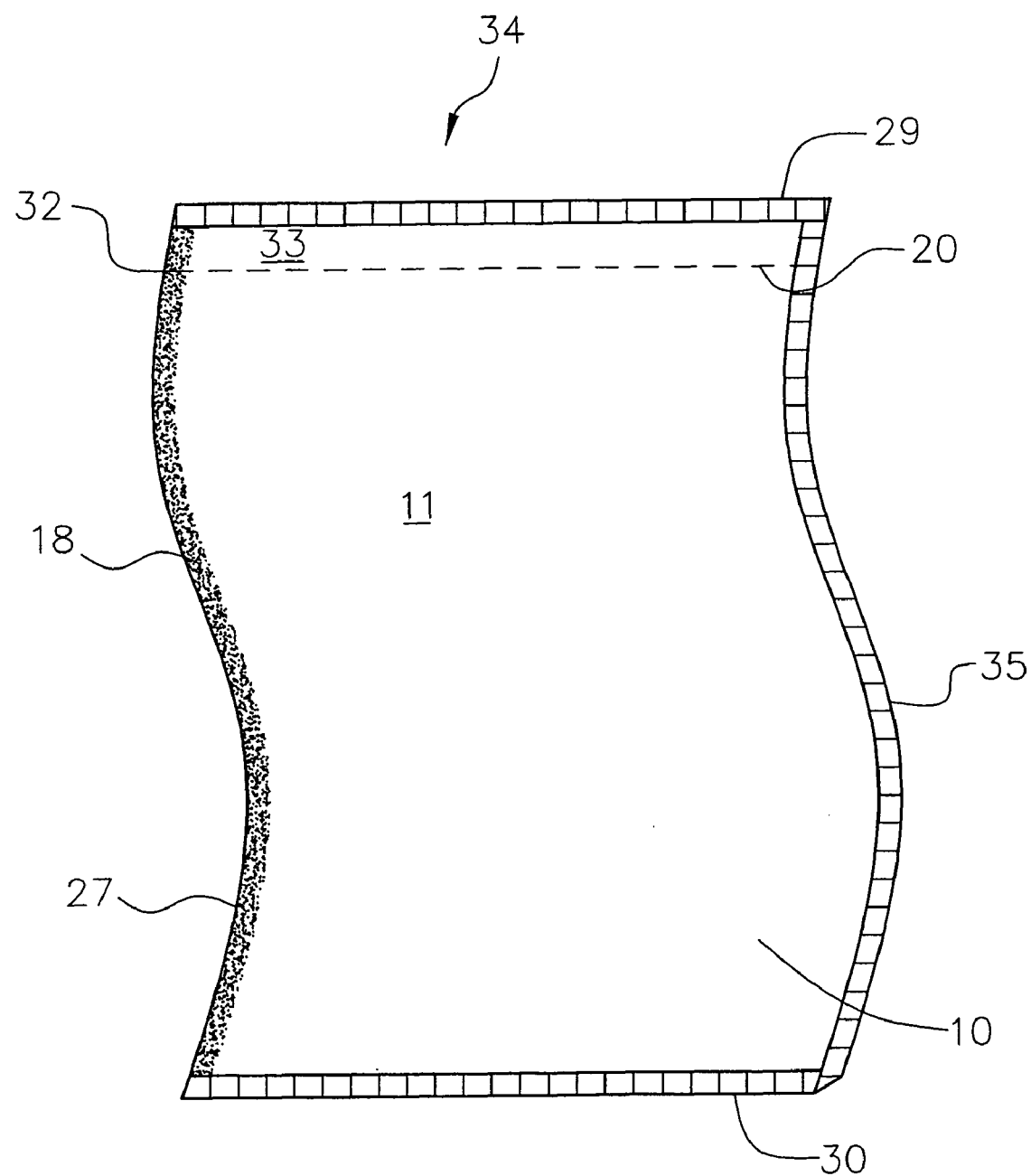
FIG. 7 is an illustration of another embodiment of a package which is manufactured by a flexible multilayer packaging film according to the present invention.

FIG. 7 represents still another embodiment of the present invention in which a package 34 is formed from a flexible multilayer packaging film 10 as described herein. In this example, a package 34 is shown having a top first seal edge portion 29 and an opposite bottom second seal edge portion 30 in parallel with the top first seal edge portion, and a first folded side edge 27 and opposite to a third seal portion 35. The package 34 is fabricated such that the first folded side edge 27 is superimposed on the surface-roughened portion 18 of the top surface layer 11 of said package thereby creating a tear initiation area 32. Score-line 20 is depicted by hidden lines which defines the directional tear zone 33 extending from the first folded side edge 27 to third seal portion 35.

In FIGS. 6 and 7, packages 23 and 34 may have one or more seal edge portions, i.e. top first seal edge portion 29, bottom second seal edge portion 30 and third seal portion 31 and/or 35 formed as a cold-seal or a heat-seal.

In the following examples illustrate the present invention.

EXAMPLES

In the examples 1-8, the production of various embodiments of a flexible multilayer packaging film according to the present invention is described.

Example 1

A flexible multilayer packaging film having a four-layer structure was produced having as a first film layer a commercially available three-ply biaxially-oriented polypropylene (ExxonMobil Bicor® CSR-2) which is then reverse-printed. The biaxially-oriented polypropylene has a thickness of 0.60 mil. A surface-roughened portion is made on this surface of the layer extending in the machine direction to form an elongated strip prior to further processing. The fourth film layer was a commercially available biaxially-oriented polyethylene terephthalate (Mitsubishi Polyester Film Hostaphan® 2BCR) having a vacuum-vapor deposited metallized aluminum coating on surface of the layer which serves as the third film layer. Hostaphan® 2BCR is available in a thickness of 0.47 mil, and has a density of 1.395 g/cm$^3$, a tear strength of 20 g/mil in the machine direction, and a total haze of 3.5%. The surface of the first layer opposite the surface having the surface-roughened portion is laminated to the metallized coating using well known adhesive laminating techniques to form a four layer film. An acrylic copolymer adhesive (Rohm and Haas Robond™ L-90D) served as the second film layer bonding the first layer to the third metal layer to which the fourth layer was already bonded. Robond™ L-90D has a density of 1.054 g/cm$^3$, pH of 6.9, and a percent solids of 42. A score-line was then applied to the resulting laminated film on the surface opposite the surface roughened film surface (i.e. on the fourth layer opposite the roughened surface which is metallized) and the score-line extended in the transverse direction across the entire width of the fourth layer.

Example 2

A flexible multilayer packaging film having a four-layer structure is produced in a manner similar to that of Example 1, but in this case the fourth layer is a commercially available two-ply heat-sealable biaxially-oriented polyethylene terephthalate (Mitsubishi Polyester Film Hostaphan® 24WS) with an additional layer of a vacuum-vapor deposited metallized aluminum coating. Hostaphan® 24WS is available in a thickness of 0.60 mils, and has a tensile strength of 32,000 in the machine direction, and a total haze of 3.2%.

Example 3

A flexible multilayer packaging film having a four-layer structure was produced in a manner similar to that of Example 1, but in this case the fourth layer was a commercially available three-ply biaxially-oriented polypropylene (AET MXT) with an additional layer of a vacuum-vapor deposited metallized aluminum coating. MXT is available in a thickness of 0.55 mils and has a tensile strength of 21,000 psi (pounds per square inch) in the machine direction/40,000 psi in the transverse direction.

Example 4

A flexible multilayer packaging film having a four-layer structure is produced in a manner similar to that of Example 1, but in this case the fourth layer is a commercially available three-ply heat-sealable biaxially-oriented polypropylene (ExxonMobil Metallyte™ MET-HB) with an additional layer of a vacuum-vapor deposited metallized aluminum coating. Metallyte™ MET-HB is available in a thickness of 0.70 mils.

Example 5

A flexible multilayer packaging film having a four-layer structure is produced in a manner similar to that of Example 1, but in this case the first layer is a commercially available biaxially-oriented polyethylene terephthalate (Mitsubishi Polyester Film Hostaphan® 2BCR). Hostaphan® 2BCR is available in a thickness of 0.47 mil, and has a density of 1.395 g/cm$^3$, a tear strength of 20 g/mil in the machine direction, and a total haze of 3.5%. Further, the fourth layer is identical to the first film layer biaxially-oriented polyethylene terephthalate (Mitsubishi Polyester Film Hostaphan® 2BCR) with an additional layer of a vacuum-vapor deposited metallized aluminum coating on surface of the layer which serves as the third film layer.

Example 6

A flexible multilayer packaging film having a four-layer structure is produced in a manner similar to that of Example 5, but in this case the fourth layer is a two-ply heat-sealable biaxially-oriented polyethylene terephthalate (Mitsubishi Polyester Film Hostaphan® 24WS) having a vacuum-vapor deposited metallized aluminum coating. Hostaphan® 24WS is available in a thickness of 0.60 mils, and has a tensile strength of 32,000 in the machine direction, and a total haze of 3.2%.

Example 7

A flexible multilayer packaging film having a four-layer structure is produced in a manner similar to that of Example 5, but in this case the fourth layer is a three-ply commercially available biaxially-oriented polypropylene (AET MXT) having a vacuum-vapor deposited metallized aluminum coating. MXT is available in a thickness of 0.55 mils and has a tensile strength of 21,000 psi in the machine direction/40,000 psi in the transverse direction.

Example 8

A flexible multilayer packaging film having a four-layer structure is produced in a manner similar to that of Example 5, but in this case the fourth layer is a three-ply commercially available heat-sealable biaxially-oriented polypropylene (ExxonMobil Metallyte™ MET-HB) having a vacuum-vapor deposited metallized aluminum coating. Metallyte™ MET-HB is available in a thickness of 0.70 mils.

Unless otherwise noted, the physical properties and performance characteristics reported herein were measured by test procedures similar to the following methods.

Tensile Strength: ASTM D 882
Density: ASTM D 1505
Percent Solids: ASTM D 2832
pH: ASTM 1293-99
Tear Strength: ASTM D 1922
Total Haze: ASTM D-1003
Oxygen Transmission Rate ASTM D-3985-81
Water Vapor Transmission Rate ASTM F-1249
Thermal Shrinkage ASTM D-2732-96

All ASTM test methods noted herein are incorporated by reference into this disclosure.

While various embodiments of the present invention have been shown and described, it should be apparent that many modifications may be made thereto without departing from the spirit and scope of the invention. Accordingly, the invention is not limited by the foregoing description, but is only limited by the scope of the claims below.

What is claimed is:

1. A flexible multilayer packaging film comprising;
    (a) a first thermoplastic film layer, a second film layer, a third film layer, and a fourth thermoplastic film layer, wherein said first thermoplastic film layer comprises a first biaxially-oriented polymer and said first thermoplastic film layer has an internal surface and an opposing external surface, wherein said external surface of said first thermoplastic film layer comprises a surface-roughened portion on an external surface of said packaging film;
    (b) wherein said second film layer comprises an adhesive and is positioned between said first thermoplastic film layer and said third film layer;
    (c) wherein said third film layer comprises a barrier material and is positioned between said second film layer and said fourth thermoplastic film layer of said film, wherein said barrier material is selected from the group consisting of polyvinyl alcohol, ethylene vinyl alcohol copolymer, polyvinyl chloride, polyvinylidene chloride, polyvinylidene chloride/methyl acrylate copolymer, polyamide, high density polyethylene, metals, metal oxides, organometallic compounds, ceramics and mixtures thereof;
    (d) wherein said fourth thermoplastic film layer comprises a second biaxially-oriented polymer and said fourth thermoplastic film layer has an internal surface and an opposing external surface, wherein said external surface comprises at least one score-line and wherein said at least one score-line has a depth that terminates prior to reaching said barrier material of said third film layer thereby not adversely affecting barrier properties of said film; and (e) wherein said surface-roughened portion and said score-line intersect at least one axis drawn between both said first thermoplastic film layer and said fourth thermoplastic film layer wherein said at least one axis is perpendicular to the plane of said first thermoplastic film layer or said fourth thermoplastic film layer when said film is positioned in a lay flat condition.

2. A flexible multilayer packaging film according to claim 1, wherein said film has an unrestrained linear thermal shrinkage in the machine direction and transverse direction of between 0-10% at 85° C. as measured in accordance with ASTM D-2732-96.

3. A flexible multilayer packaging film according to claim 2, wherein said film has an unrestrained linear thermal shrinkage in the machine direction and transverse direction of between 0-5% at 85° C. as measured in accordance with ASTM D-2732-96.

4. A flexible multilayer packaging film according to claim 1, further comprising a fifth film layer positioned between said third film layer and said fourth thermoplastic film layer, wherein said fifth film layer comprises an adhesive.

5. A flexible multilayer packaging film according to claim 1, wherein said at least one score-line of said fourth thermoplastic film layer has a depth of from about 50-95% of the thickness of said fourth thermoplastic film layer.

6. A flexible multilayer packaging film according to claim 1, wherein said at least one score-line is continuous.

7. A flexible multilayer packaging film according to claim 1, wherein said at least one score-line is non-continuous.

8. A flexible multilayer packaging film according to claim 1, wherein said at least one score-line is formed by optical ablation.

9. A flexible multilayer packaging film according to claim 1, wherein both said first biaxially-oriented polymer and said second biaxially-oriented polymer are selected from the group consisting of a polyester, a polyolefin, a polyamide, and a blend thereof.

10. A flexible multilayer packaging film according to claim 1, wherein both said first biaxially-oriented polymer and said second biaxially-oriented polymer are selected from the group consisting of a polyethylene terephthalate, a polypropylene, a polyamide, and a blend thereof.

11. A flexible multilayer packaging film according to claim 1, wherein both said first biaxially-oriented polymer and said second biaxially-oriented polymer are the same biaxially-oriented polymer.

12. A flexible multilayer packaging film according to claim 1, wherein said barrier material is an oxygen barrier and said film has an oxygen transmission rate of from about 0.01-1.00 $cm^3/100$ $in.^2$ (0.1550-15.50 $cm^3/m^2$) as measured in accordance with ASTM D-3985-81 test method.

13. A flexible multilayer packaging film according to claim 1, wherein said barrier material is a water vapor barrier and said film has a water vapor transmission rate of from about 0.01-1.00 g./100 $in.^2$ (0.1550-15.50 $cm^3/m^2$) as measured in accordance with ASTM F-1249 test method.

14. A flexible multilayer packaging film according to claim 1, wherein said barrier material is a metallic coating on said external surface of said fourth thermoplastic film layer wherein said metallic coating has a thickness of from about 200-700 Å.

15. A flexible multilayer packaging film according to claim 14, wherein said metallic coating is a material selected from the group consisting of metal, metallic oxide, organometallic compounds, ceramic and mixtures thereof.

16. A flexible multilayer packaging film according to claim 15, wherein said metallic coating comprises aluminum, zinc, nickel, copper, bronze, gold, silver, tin, or alloys thereof.

17. A flexible multilayer packaging film according to claim 1, wherein said external surface of said fourth thermoplastic film layer further comprises a cold-seal adhesive.

18. A flexible multilayer packaging film according to claim 1, wherein said first thermoplastic film layer is an outer film layer.

19. A flexible multilayer packaging film according to claim 1, wherein said fourth thermoplastic film layer is an inner film layer.

20. A flexible multilayer packaging film according to claim 1, wherein said film has a thickness of from about 0.75-3.5 mils.

21. A flexible multilayer packaging film according to claim 1, wherein said film further comprises;
at least one first folded side edge superimposed on said surface-roughened portion, a top first seal edge portion and an opposite bottom second seal edge portion in parallel with said top first seal edge portion, and a third seal portion disposed perpendicular between said top first seal edge portion and said bottom second seal edge portion and parallel to said at least one first folded side edge therein defining a package; and
wherein said package comprises a tear-initiation area comprising said surface-roughened portion and a directional tear zone comprising said at least one score-line.

22. A package according to claim 21, wherein said top first seal edge portion, said bottom second seal edge portion, or said third seal edge portion includes a cold-seal.

23. A package according to claim 21, wherein said top first seal edge portion, said bottom second seal edge portion, or said third seal edge portion includes a heat-seal.

24. A flexible multilayer packaging film comprising;
(a) a first thermoplastic film layer, a second film layer, a third film layer, and a fourth thermoplastic film layer, wherein said first thermoplastic film layer comprises a first biaxially-oriented polymer selected from the group consisting of a polyester, a polyolefin, a polyamide and a blend thereof, and said first thermoplastic film layer has an internal surface and an opposing external surface, wherein said first thermoplastic film layer comprises a surface-roughened portion on an external surface of said first thermoplastic film layer;
(b) wherein said second film layer comprises an adhesive and is positioned between said first thermoplastic film layer and said third film layer;
(c) wherein said third film layer comprises a barrier material and is positioned between said second film layer and said fourth thermoplastic film layer of said film, said barrier material is a metallic coating having a thickness of from about 200-700 Å;
(d) wherein said fourth thermoplastic film layer comprises a second biaxially-oriented polymer selected from the group consisting of a polyester, a polyolefin, a polyamide and a blend thereof, said fourth thermoplastic film layer has an internal surface and an opposing external surface, wherein said external surface includes at least one score-line and wherein said at least one score-line has a depth that terminates prior to reaching said barrier material of said third film layer thereby not adversely affecting barrier properties of said film; and
(e) wherein said surface-roughened pattern and said score-line intersect at least one axis drawn between both said first thermoplastic film layer and said fourth thermoplastic film layer wherein said at least one axis is perpendicular to the plane of said first thermoplastic film layer or said fourth thermoplastic film layer when said film is positioned in a lay flat condition.

25. A flexible multilayer packaging film according to claim 24, wherein said film has an unrestrained linear thermal shrinkage in the machine direction and transverse direction of between 0-10% at 85° C. as measured in accordance with ASTM D-2732-96.

26. A flexible multilayer packaging film according to claim 25, wherein said film has an unrestrained linear thermal shrinkage in the machine direction and transverse direction of between 0-5% at 85° C. as measured in accordance with ASTM 0-27.32-96.

27. A flexible multilayer packaging film according to claim 24, further comprising a fifth film layer positioned between said third film layer and said fourth thermoplastic film layer, wherein said fifth film layer is an adhesive.

28. A flexible multilayer packaging film according to claim 24, wherein said at least one score-line has a depth of from about 50-95% of the thickness of said fourth thermoplastic film layer.

29. A flexible multilayer packaging film according to claim 24, wherein said at least one score-line is continuous.

30. A flexible multilayer packaging film according to claim 24, wherein said at least one score-line is non-continuous.

31. A flexible multilayer packaging film according to claim 24, wherein said at least one score-line is formed by optical ablation.

32. A flexible multilayer packaging film according to claim 24, wherein both said first biaxially-oriented polymer and said second biaxially-oriented polymer are selected from the group consisting of a polyethylene terephthalate, a polypropylene, a polyamide and a blend thereof.

33. A flexible multilayer packaging film according to claim 24, wherein said first biaxially-oriented polymer and said second biaxially-oriented polymer are the same biaxially-oriented polymer.

34. A flexible multilayer packaging film according to claim 24, wherein said barrier material is an oxygen barrier and said film has an oxygen transmission rate of from about 0.01-1.00 cm$^3$/100 in.$^2$ (0.1550-15.50 cm$^3$/m$^2$) as measured in accordance with ASTM D-3985-81 test method.

35. A flexible multilayer packaging film according to claim 24, wherein said barrier material is a water vapor barrier and said film has a water vapor transmission rate of from about 0.01-1.00 g./100 in.$^2$ (0.1550-15.50 cm$^3$/m$^2$) as measured in accordance with ASTM F-1249 test method.

36. A flexible multilayer packaging film according to claim 24, wherein said metallic coating is a material selected from the group consisting of metal, metal oxide, organometallic, ceramic and mixtures thereof.

37. A flexible multilayer packaging film according to claim 36, wherein said metallic coating is a material selected from the group consisting of aluminum, zinc, nickel, copper, bronze, gold, silver, tin, and alloys thereof.

38. A flexible multilayer packaging film according to claim 24, wherein said first thermoplastic film layer is an outer film layer and said fourth thermoplastic film layer is an inner film layer.

39. A flexible multilayer packaging film according to claim 24, wherein said film further comprises;
at least one first folded side edge superimposed on said surface-roughened portion, a top first seal edge portion and an opposite bottom second seal edge portion in parallel with said top first seal edge portion, and a third seal portion disposed perpendicular between said top first seal edge portion and said bottom second seal edge portion and parallel with said at least one first folded side edge therein defining a package; and
wherein said package comprises a tear-initiation area comprising said surface-roughened portion and a directional tear zone comprising said at least one score-line.

40. A package according to claim 39, wherein said top first seal edge portion, said bottom second seal edge portion, or said third seal edge portion includes a cold-seal.

41. A package according to claim 39, wherein said top first seal edge portion, said bottom second seal edge portion, or said third seal edge portion includes a heat-seal.

42. A flexible multilayer packaging film comprising;
(a) a first thermoplastic film layer, a second film layer, a third film layer, and a fourth thermoplastic film layer, wherein said first thermoplastic film layer comprises at least a first biaxially-oriented polymer selected from the group consisting of a polyethylene terephthalate, a polypropylene, a polyamide, and a blend thereof, and said first thermoplastic film layer is an outer film layer and said first thermoplastic film layer has an internal surface and an opposing external surface, wherein said external surface of said first thermoplastic film layer comprises a surface-roughened portion;
(b) wherein said second film layer comprises an adhesive and is positioned between said first thermoplastic film layer and said third film layer,
(c) wherein said third film layer comprises a barrier material and is positioned between said second film layer and said fourth thermoplastic film layer of said film, said barrier material is a metallic coating on said external surface of said third film layer, wherein said metallic coating has a thickness of from about 200-700 Å and said metallic coating is a material selected from the group consisting of metal, metal oxide, organometallic, ceramic and mixtures thereof and;
(d) wherein said fourth thermoplastic film layer comprises a second biaxially-oriented polymer selected from the group consisting of a polyethylene terephthalate, a polypropylene, a polyamide, and a blend thereof, said fourth thermoplastic film layer is an inner film layer and said fourth thermoplastic film layer has an internal surface and an opposing external surface, wherein said external surface comprises at least one score-line and wherein said at least one score-line has a depth that terminates prior to reaching said barrier material of said third film layer thereby not adversely affecting barrier properties of said film; and
(e) wherein said surface-roughened portion and said score-line intersect at least one axis drawn between both said first thermoplastic film layer and said fourth thermoplastic film layer wherein said at least one axis is perpendicular to the plane of said first thermoplastic film layer or said fourth thermoplastic film layer when said film is positioned in a lay flat condition.

43. A flexible multilayer packaging film according to claim 42, wherein said film has an unrestrained linear thermal shrinkage in the machine direction and transverse direction of between 0-10% at 85° C. as measured in accordance with ASTM D-2732-96.

44. A flexible multilayer packaging film according to claim 43, wherein said film has an unrestrained linear thermal shrinkage in the machine direction and transverse direction of between 0-5% at 85° C. as measured in accordance with ASTM D-2732-96.

45. A flexible multilayer packaging film according to claim 42, further comprising a fifth film layer positioned between said third film layer and said fourth thermoplastic film layer, wherein said fifth film layer is an adhesive.

46. A flexible multilayer packaging film according to claim 42, wherein said at least one score-line has a depth of from about 50-95% of the thickness of said fourth thermoplastic film layer.

47. A flexible multilayer packaging film according to claim 42, wherein said at least one score-line is continuous.

48. A flexible multilayer packaging film according to claim 42, wherein said at least one score-line is non-continuous.

49. A flexible multilayer packaging film according to claim 42, wherein said at least one score-line is formed by optical ablation.

50. A flexible multilayer packaging film according to claim 42, wherein both said first biaxially-oriented polymer and said second biaxially-oriented polymer are the same biaxially-oriented polymer.

51. A flexible multilayer packaging film according to claim 42, wherein said barrier material is an oxygen barrier and said film has an oxygen transmission rate of from about 0.01-1.00 cm$^3$/100 in.$^2$ (0.1550-15.50 cm$^3$/m$^2$) as measured in accordance with ASTM D-3985-81 test method.

52. A flexible multilayer packaging film according to claim 42, wherein said barrier material is a water vapor barrier and said film has a water vapor transmission rate of from about 0.01-1.00 g./100 in.$^2$ (0.1550-15.50 cm$^3$/m$^2$) as measured in accordance with ASTM F-1249 test method.

53. A flexible multilayer packaging film according to claim 42, wherein said metallic coating is a material selected from the group consisting of aluminum, zinc, nickel, copper, bronze, gold, silver, tin, and alloys thereof.

54. A package comprising;
   (a) a flexible multilayer packaging film comprising;
   (i) a first thermoplastic film layer, a second film layer, a third film layer, and a fourth thermoplastic film layer, wherein said first thermoplastic film layer comprises at least a first biaxially-oriented polymer selected from the group consisting of a polyethylene terephthalate, a polypropylene, a polyamide, and a blend thereof, said first thermoplastic film layer is an outer film layer and said first thermoplastic film layer has an internal surface and an opposing external surface, wherein said external surface of said first thermoplastic film layer comprises a surface-roughened portion;
   (ii) wherein said second film layer comprises an adhesive and is positioned between said first thermoplastic film layer and said third film layer:
   (iii) wherein said third film layer comprises a barrier material and is positioned between said second film layer and said fourth thermoplastic film layer of said film, wherein said barrier material is a metallic coating on said internal surface of said fourth thermoplastic film layer, wherein said metallic coating has a thickness of from about 200-700 Å and said metallic coating is a material selected from the group consisting of metal, metal oxide, organometallic, ceramic and mixtures thereof;
   (iv) wherein said fourth thermoplastic film layer comprises a second biaxially-oriented polymer selected from the group consisting of a polyethylene terephthalate, a polypropylene, a polyamide, and a blend thereof, said fourth thermoplastic film layer is an inner film layer and said fourth thermoplastic film layer has an internal surface and an opposing external surface, wherein said external surface includes at least one score-line and wherein said at least one score-line has a depth that terminates prior to reaching said barrier material of said third film layer thereby not adversely affecting barrier properties of said film;
   (b) wherein said package further comprises at least one first folded side edge, a top first seal edge portion and an opposite bottom second seal edge portion in parallel with said top first seal edge portion, and a third seal portion disposed perpendicular between said first seal edge portion and said bottom second seal edge portion and parallel with said at least one first folded side edge;
   (c) a tear-initiation area;
   (d) a directional tear zone; and
   (e) wherein said first folded side edge is superimposed on said surface roughening portion of said first thermoplastic film layer of said packaging film.

55. A package according to claim 54, wherein said film has an unrestrained linear thermal shrinkage in the machine direction and transverse direction of between 0-10% at 85° C. as measured in accordance with ASTM D-2732-96.

56. A package according to claim 55, wherein said film has an unrestrained linear thermal shrinkage in the machine direction and transverse direction of between 0-5% at 85° C. as measured in accordance with ASTM D-2732-96.

57. A package according to claim 54, wherein said film further comprises a fifth film layer positioned between said third film layer and said fourth thermoplastic film layer, wherein said fifth film layer is an adhesive.

58. A package according to claim 54, wherein said barrier material is an oxygen barrier and said film has an oxygen transmission rate of from about 0.01-1.00 cm$^3$/100 in.$^2$ (0.1550-15.50 cm$^3$/m$^2$) as measured in accordance with ASTM D-3985-81 test method.

59. A package according to claim 54, wherein said barrier material is a water vapor barrier and said film has a water vapor transmission rate of from about 0.01-1.00 g./100 in.$^2$ (0.1550-15.50 cm$^3$/m$^2$) as measured in accordance with ASTM F-1249 test method.

60. A package according to claim 54, wherein said metallic coating is a material selected from the group consisting of aluminum, zinc, nickel, copper, bronze, gold, silver, tin, and alloys thereof.

61. A package according to claim 54, wherein said at least one score-line has a depth of from about 50-95% of the thickness of said fourth thermoplastic film layer.

62. A package according to claim 54, wherein said at least one score-line is continuous.

63. A package according to claim 54, wherein said at least one score-line is non-continuous.

64. A package according to claim 54, wherein said at least one score-line is formed by optical ablation.

65. A package according to claim 54, wherein said top first seal edge portion, said bottom second seal edge portion, or said third seal edge portion includes a cold-seal.

66. A package according to claim 54, wherein said top first seal edge portion, said bottom second seal edge portion, or said third seal edge portion includes a heat-seal.

67. A package according to claim 54, further comprising a second folded side edge opposite and parallel to said at least one first folded side edge.

68. A flexible multilayer packaging film comprising;
   (a) a first thermoplastic film layer, a second film layer, a third film layer, and a fourth thermoplastic film layer, wherein said first thermoplastic film layer comprises a polymer and said first thermoplastic film layer has an internal surface and an opposing external surface, wherein said external surface of said first thermoplastic film layer comprises a surface-roughened portion on an external surface of said packaging film;

(b) wherein said second film layer comprises an adhesive and is positioned between said first thermoplastic film layer and said third film layer;

(c) wherein said third film layer comprises a barrier material and is positioned between said second film layer and said fourth thermoplastic film layer of said film, wherein said barrier material is selected from the group consisting of polyvinyl alcohol, ethylene vinyl alcohol copolymer, polyvinyl chloride, polyvinylidene chloride, polyvinylidene chloride/methyl acrylate copolymer, polyamide, high density polyethylene, metals, metal oxides, organometallic compounds, ceramics and mixtures thereof;

(d) wherein said fourth thermoplastic film layer comprises a biaxially-oriented polymer and said fourth thermoplastic film layer has an internal surface and an opposing external surface, wherein said external surface comprises at least one score-line and wherein said at least one score-line has a depth that terminates prior to reaching said barrier material of said third film layer thereby not adversely affecting barrier properties of said film; and (e) wherein said surface-roughened portion and said score-line intersect at least one axis drawn between both said first thermoplastic film layer and said fourth thermoplastic film layer wherein said at least one axis is perpendicular to the plane of said first thermoplastic film layer or said fourth thermoplastic film layer when said film is positioned in a lay flat condition.

69. A flexible multilayer packaging film according to claim 68, wherein said film has an unrestrained linear thermal shrinkage in the machine direction and transverse direction of between 0-10% at 85° C. as measured in accordance with ASTM D-2732-96.

70. A flexible multilayer packaging film according to claim 68, wherein said at least one score-line of said fourth thermoplastic film layer has a depth of from about 50-95% of the thickness of said fourth thermoplastic film layer.

71. A flexible multilayer packaging film according to claim 68, wherein said at least one score-line is continuous.

72. A flexible multilayer packaging film according to claim 68, wherein said at least one score-line is non-continuous.

73. A flexible multilayer packaging film according to claim 68, wherein said at least one score-line is formed by optical ablation.

74. A flexible multilayer packaging film according to claim 68, wherein said polymer is selected from the group consisting of a polyester, a polyolefin, a polyamide and a blend thereof and said biaxially-oriented polymer is selected from the group consisting of a polyester, a polyolefin, a polyamide, and a blend thereof.

75. A flexible multilayer packaging film according to claim 68, wherein said polymer is selected from the group consisting of a polyethylene terephthalate, a polypropylene, a polyamide, and a blend thereof and said biaxially-oriented polymer is selected from the group consisting of a polyethylene terephthalate, a polypropylene, a polyamide, and a blend thereof.

76. A flexible multilayer packaging film according to claim 68, wherein said barrier material is an oxygen barrier and said film has an oxygen transmission rate of from about 0.01-1.00 cm$^3$/100 in.$^2$ (0.1550-15.50 cm$^3$/m$^2$) as measured in accordance with ASTM 0-3985-81 test method.

77. A flexible multilayer packaging film according to claim 68, wherein said barrier material is a water vapor barrier and said film has a water vapor transmission rate of from about 0.01-1.00 g./100 in.$^2$ (0.1550-15.50 cm$^3$/m$^2$) as measured in accordance with ASTM F-1249 test method.

78. A flexible multilayer packaging film according to claim 68, wherein said first thermoplastic film layer is an inner film layer.

79. A flexible multilayer packaging film according to claim 68, wherein said fourth thermoplastic film layer is an outer film layer.

80. A flexible multilayer packaging film according to claim 68, wherein said film has a thickness of from about 0.75-3.5 mils.

81. A flexible multilayer packaging film according to claim 68, wherein said film further comprises;

at least one first folded side edge superimposed on said surface-roughened portion, a top first seal edge portion and an opposite bottom second seal edge portion in parallel with said top first seal edge portion, and a third seal portion disposed perpendicular between said top first seal edge portion and said bottom second seal edge portion and parallel to said at least one first folded side edge therein defining a package; and wherein said package comprises a tear-initiation area comprising said surface-roughened portion and a directional tear zone comprising said at least one score-line.

* * * * *